Patent 3,538,081, Patented Nov. 3, 1970 …

3,538,081
AZETIDINECARBONYL FLUORIDES AND OXAZIN-2-ONES

David C. England, Wilmington, Del., assignor to E. I. du Pont de Nemours and Company, Wilmington, Del., a corporation of Delaware
No Drawing. Filed Sept. 8, 1967, Ser. No. 666,452
Int. Cl. C07d 25/02, 87/08
U.S. Cl. 260—239                                           8 Claims

ABSTRACT OF THE DISCLOSURE

Perfluoro substituted azetidinecarbonyl fluorides and oxazin-2-ones which are useful as solvents for fluorocarbon polymer and as surface treating agents for textiles are produced by heating a mixture of aliphatic isocyanate and perfluoromethacrylyl fluoride.

BACKGROUND OF THE INVENTION

This invention relates to fluorinated derivatives of azetidine and 1,3-oxazine.

SUMMARY OF THE INVENTION

This invention is directed to a compound selected from the group consisting of

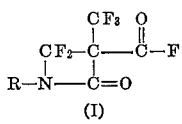
(I)

and

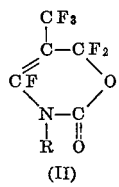
(II)

wherein R is alkyl of 1–18 carbons or cycloalkyl of 5–6 carbons.

This invention is also directed to a process of preparing the compounds of this invention by reacting a mixture of perfluoromethacrylyl fluoride and an alkyl or cycloalkyl isocyanate at a temperature not exceeding about 300° C. The compounds of this invention are useful as solvents for fluorocarbon polymers as treating agents for textiles for imparting water repellent properties to the textiles and as intermediates to N-alkyl and N-cycloalkylketenimines which are useful for imparting anti-static properties to textiles.

DESCRIPTION OF THE PREFERRED EMBODIMENTS

The compounds of Formula I are 2,2-difluoro-1-alkyl-4-oxo-3-(trifluoromethyl)-3-azetidinecarbonyl fluorides or 2,2 - difluoro - 1 - cycloalkyl-4-oxo-3-(trifluoromethyl)-3-azetidinecarbonyl fluorides, and the compounds of Formula II are 3,6-dihydro-3-alkyl-4,6,6-trifluoro-5-(trifluoromethyl) - 2H - oxazine - 2 - ones or 3,6-dihydro-3-cycloalkyl - 4,6,6 - trifluoro-5-(trifluoromethyl)-2H-oxazin-2-ones. The compounds of the Formulae I and II, which are isomers both being 1:1 adducts of perfluoromethacrylyl fluoride,

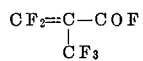

and an alkyl or cycloalkyl isocyanate of formula

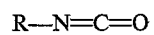

are formed by heating at a temperature in the range of 50–300° C., a mixture of perfluoromethacrylyl fluoride and an alkyl or cycloalkyl isocyanate. When the reaction temperature does not exceed about 175° C., the reaction product consists of a mixture of the azetidinecarbonyl fluoride and the oxazin-2-one. At temperatures of about 175° C. or higher, the oxazin-2-one is partly or entirely pyrolyzed to carbon dioxide and the corresponding ketenimine of formula $(CF_3)_2C=C=N-R$, so that the reaction product formed is a mixture of the azetidinecarbonyl fluoride and the corresponding substituted bis(trifluoromethyl)ketenimine. As a modification of the process, the ketenimines can also be prepared separately by heating the oxazine-2-one, previously made and isolated, at a temperature of at least 175° C. and preferably 200° C. or higher. These reactions can be represented by the following equations:

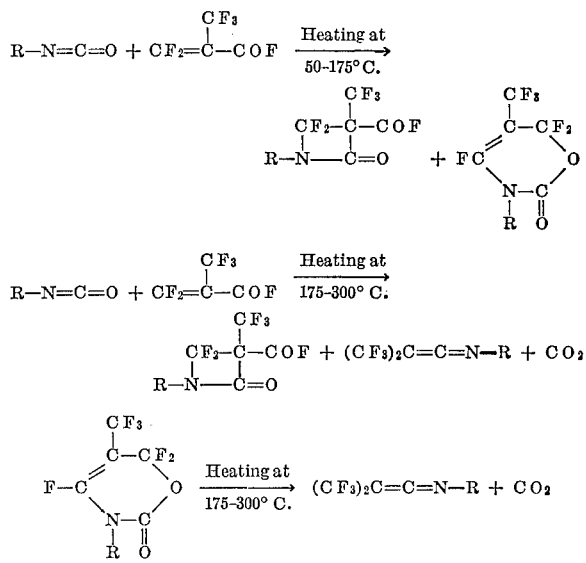

In the condensation of perfluoromethacrylyl fluoride with the alkyl isocyanate or cycloalkyl isocyanate, the reactant ratios are not critical since some product is formed when the products are reacted together at either a high or a low ratio. Preferably, the two reactants are used in approximately equimolar amounts, or a slight to moderate excess of the isocyanate reactant is employed.

The reaction can be carried out at atmospheric pressure under reflux in the lower temperature range but, since perfluoromethacrylyl fluorine boils at 52° C., it is preferably carried out in sealed vessels, at the autogenous pressure developed by the reactants and solvent, if any, or under additional pressure, e.g., up to 500 atmospheres, supplied by an inert gas, such as nitrogen or helium.

A solvent or diluent for the reaction is not necessary. If desired, however, a solvent inert in the presence of the reactants and reaction products can be used. For this purpose, aprotic solvents such as the hydrocarbons, halohydrocarbons and nitrohydrocarbons are suitable. Examples of such solvents are hexane, octane, cyclohexane, benzene, toluene, the xylenes, methylene chloride, carbon tetrachloride, 1,1,2-trichloro-1,2,2-trifluoroethane, chlorobenzene, nitromethane, nitroethane, and the like. The relative ratios of the reaction products appears to be affected by the polarity of the solvent. In general, polar solvents favor the production of the azetinecarbonyl fluoride compounds, while non-polar solvents favor the production of the oxazin-2-one compounds. In the absence of a solvent and at temperatures below about 175° C., the azetinecarbonyl fluoride and oxazin-2-one are formed in approximately equal amounts.

It is desirable for more practical reaction rates to operate at 75° C. or above. At a temperature of the order of 100° C., the reaction producing both the azetinecarbonyl fluorides and oxazin-2-ones is essentially completed in 24–48 hours, with correspondingly shorter periods as the temperature increases, e.g., 2–4 hours at 150–175° C. Above this temperature, pyrolysis of the oxazin-2-ones to the N-alkylbis(trifluoromethyl)ketenimine occurs.

The reaction products are readily separated by distillation at atmospheric or reduced pressure. Chromatographic methods can be used to effect this separation.

Perfluoromethacrylyl fluoride can be prepared by the various methods, one of which is the rearrangement of bis(trifluoromethyl)ketene, reported by Knunyants et al. in Izv. Adad. Nauk. S.S.S.R., Ser. Khim. 1963, 1393–1397 and 1570–1576. An improved preparation of perfluoromethacrylylfluoride, involving the base-catalyzed rearrangement of bis(trifluoromethyl)ketene is described below.

Nitrogen gas was bubbled through a vessel containing 36 g. of bis(trifluoromethyl)ketene and cooled to about −25° C. The effluent gas was passed through a rotameter, then through a quartz tube about 45 cm. long and 2.5 cm. inside diameter filled with sodium fluoride pellets about 3 mm. in diameter. The tube was electrically heated to 206° C. over a length of about 25 cm., and connected at its outlet side to a trap cooled with Dry Ice/acetone. The gas flow rate was between 200 and 400 cc./minute.

After all of the bis(trifluoromethyl)ketene had vaporized, the product condensed in the cold trap was transferred to a still pot. The still was connected to a receiver followed by a trap cooled with Dry Ice/acetone. Distillation gave 13.2 g. of liquid boiling at 52° C. at 760 mm. pressure, and 19 g. of recovered bis(trifluoromethyl)-ketene in the cold trap. The product boiling at 52° C. was perfluoromethacrylyl fluoride, as shown by elemental and spectral analyses.

*Analysis.*—Calcd. for $C_4F_6O$ (percent): C, 26.99; F, 64.04. Found (percent): C, 27.37; F, 64.07.

The infrared spectrum showed absorption bands at $5.40\mu$ (CF=O) and $5.8\mu$ ($CF_2$=C). The fluorine nuclear magnetic resonance spectrum also confirmed the structure.

The following examples illustrate the invention.

EXAMPLE 1

Cyclic adducts of perfluoromethacrylyl fluoride and methyl isocyanate

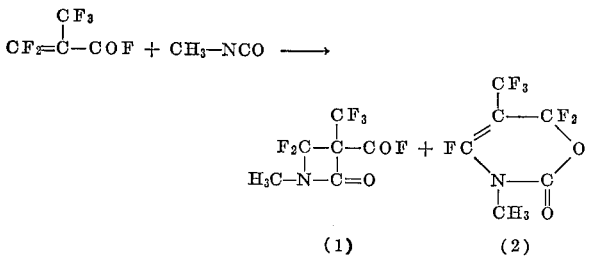

Into each of three Carius tubes was placed 33 ml. (0.3 mole) of perfluoromethacrylyl fluoride and 30 ml. (about 0.5 mole) of methyl isocyanate. The tubes were heated at 100° C. for 40 hours, after which their contents were combined. Distillation of the reaction mixture gave 96.5 g. (46% yield) of compound 1, B.P. 78° C./10 mm., $n_D^{25}$ 1.3470, and 96.5 g. (46% yield) of compound 2, B.P. 57° C./0.8 mm., $n_D^{25}$ 1.3865. Compound 2 solidified and, after recrystallization from petroleum ether, melted at 36–37° C. These two isomeric compounds were characterized as follows:

Compound 1.—2,2-difluoro-1-methyl-4-oxo-3-(trifluoromethyl)-3-azetidinecarbonyl fluoride The infrared spectrum showed absorptions at $5.35$ and $5.40\mu$ (double peak; COF) and at $5.60\mu$ (C=O). The proton and $F^{19}$ nuclear magnetic resonance spectra supported the assigned structure.

*Analysis.*—Calcd. for $C_6H_3F_6NO_2$ (percent): C, 30.66; H, 1.29; F, 48.51; N, 5.96. Found (percent): C, 30.83; H, 1.35; F, 48.11; N, 5.94.

Compound 1 was further characterized by the following reactions:

(A) Amidation

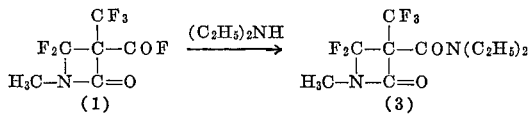

The acid fluoride 1 (30 g.) was added dropwise to 130 ml. (10-fold excess) of diethylamine in 200 ml. of ether with stirring and the mixture was refluxed gently for 0.5 hour after addition. It was then washed well with water, dried and distilled to give 25 g. of the diethylamide 3, B.P. 98° C./2.5 mm., $n_D^{25}$ 1.4164. The infrared spectrum showed absorption at $5.44$ and $5.52\mu$ (doublet, ring C=O) and $6.00\mu$ (amide C=O). The proton and $F^{19}$ n.m.r. spectra supported the structure.

*Analysis.*—Calcd. for $C_{10}H_{13}F_5N_2O_2$ (percent): C, 41.70; H, 4.55; F, 32.99; N, 9.73. Found (percent): C, 41.69; H, 4.70; F, 32.60; N, 9.68.

(B) Esterification and pyrolysis

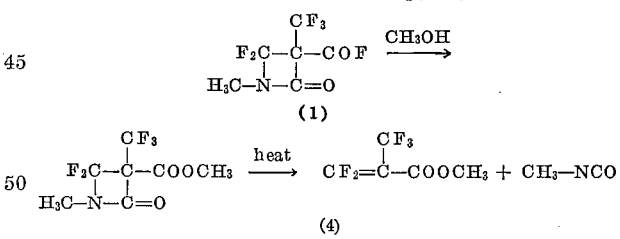

The acid fluoride 1 (30 g.) was added dropwise with stirring to 50 ml. of methanol, keeping the temperature below 60° C. When addition was complete the mixture was refluxed for 15 minutes, cooled, and poured into water. The organic layer was separated, washed three times with water, dried and distilled. There was obtained 24 g. of the ester 4, B.P. 55° C./3 mm., $n_D^{25}$ 1.3734. The infrared spectrum showed absorption at $5.42\mu$ (ring C=O) and $5.71\mu$ (ester C=O). The proton and $F^{19}$ n.m.r. spectra were consistent with the assigned structure.

*Analysis.*—Calcd. for $C_7H_6F_5NO_3$ (percent): C, 34.04; H, 2.45; F, 38.46; N, 5.67. Found (percent): C, 34.35; H, 2.50; F, 38.05; N, 5.88.

A sample (25 g.) of the ester 4 was passed over quartz chips at 700° C. at an internal pressure of about 1 mm. and the effluent gas passed through a trap cooled in liquid nitrogen. The material condensed in the trap was distilled to give about 15 g. of a mixture containing about 2 g. of methyl isocyanate and 3 g. of methyl perfluoromethacrylate, B.P. 85–90° C. The latter was purified by gas chromatography and found by infrared and n.m.r. spectra to be identical with a sample prepared by dehydrofluorination of methyl α-hydrohexafluoroisobutyrate.

*Analysis.*—Calcd. for $C_5H_3F_5O_2$ (percent): C, 31.60; H, 1.59; F, 50.00. Found (percent): C, 31.93; H, 1.82; F, 48.09.

Compound 2.—3,6-dihydro-3-methyl-4,6,6-trifluoro-5-(trifluoromethyl)-2H-1,3-oxazin-2-one The infrared spectrum showed absorption at 5.58μ (C=O) and 5.80μ (C=C). The proton and $F^{19}$ n.m.r. spectra were in agreement with the assigned structure.

*Analysis.*—Calcd. for $C_6H_3F_6NO_2$ (percent): C, 30.66; H, 1.29; F, 48.51; N, 5.96. Found (percent): C, 31.13; H, 1.50; F, 47.93; N, 6.07.

Compound 2 was further characterized by the following reactions:

(C) Methanolysis

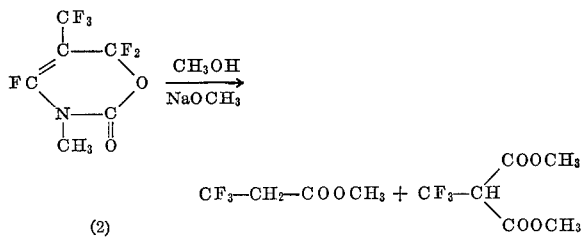

A mixture of 15 g. of compound 2, 25 ml. of methanol and 0.5 g. of sodium methoxide was sealed in a Carius tube and the tube was heated at 100° C. for about 16 hours. The reaction product was poured into water and the aqueous mixture was extracted with methylene chloride. The extract was dried and distilled. There was obtained 2.2 g. (24% yield) of methyl 3,3,3-trifluoropropionate, B.P. 54° C./150 mm., and 7.1 g. (55% yield) of methyl trifluoromethylmalonate, B.P. 99° C./50 mm. These products were purified by gas chromatography and characterized by elemental analysis and by their infrared and n.m.r. spectra.

(D) Pyrolysis

This reaction of compound 2 is described in the example that follows:

EXAMPLE 2

Preparation of N-methylbis(trifluoromethyl)ketenimine

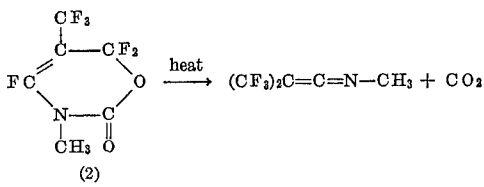

Compound 2 (9.5 g.) was heated for 8 hours at 200° C. in a Carius tube. After venting the carbon dioxide, the product was distilled to give 6 g. (78% yield) of N-methylbis(trifluoromethyl)ketenimine, B.P. 44° C./110 mm., $n_D^{25}$ 1.3335. In the infrared, this product absorbs at 4.75μ (C=C=N). Its proton and $F^{19}$ n.m.r. spectra were consistent with the assigned structure.

*Analysis.*—Calcd. for $C_5H_3F_6N$ (percent): C, 31.44; H, 1.58; F, 59.69; N, 7.33. Found (percent): C, 31.70; H, 1.73; F, 59.98; N, 7.30.

N-methylbis(trifluoromethyl)ketenimine was further characterized by its hydrolysis to N-methyl-α-hydrohexafluoroisobutyramide and its halide-ion catalyzed dimerization to a mixture of two cyclic dimers. These reactions are described below.

(A) Hydrolysis

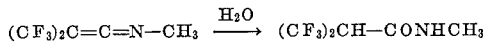

A mixture of 5 g. of N-methylbis(trifluoromethyl)ketenimine and 2 ml. of water was sealed in a Carius tube and the tube was heated at 100° C. for about 16 hours. The crystalline reaction product was recrystallized from nitromethane to give 5.1 g. (93% yield) of N-methyl-α-hydrohexafluoroisobutyramide, M.P. 155–156° C., further identified by elemental analysis and infrared and n.m.r. spectroscopy.

(B) Dimerization

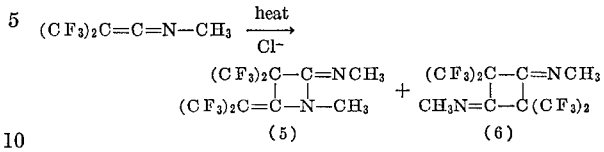

Although N-methylbis(trifluoromethyl)ketenimine does not dimerize thermally, it does dimerize when heated in the presence of catalytic amounts of a halide ion such as the chloride or fluoride ion. Two cyclic dimers are obtained. The predominant dimer has structure 5, the other dimer has structure 6.

A mixture of 25 g. of N-methylbis(trifluoromethyl)ketenimine, 0.5 g. of tetramethylammonium chloride and 5 ml. of methylene chloride was heated in a Carius tube at 100° C. for 60 hours. Distillation of the reaction product gave 20.1 g. (80.5% yield) of dimer 5, B.P. 59° C./10 mm., $n_D^{25}$ 1.3809, and 1.7 g. (6.8% yield) of solid dimer 6 which was recrystallized from hexane, M.P. 97–99° C.

Dimer 5, 2-hexafluoroisopropylidene-3,3-bis(trifluoromethyl)-1-methyl-4-methyliminoazetidine, absorbed in the infrared at 5.88μ (C=C) and 6.01μ (C=N). Its proton and $F^{19}$ n.m.r. spectra were consistent with the assigned structure.

*Analysis.*—Calcd. for $C_{10}H_6F_{12}N_2$ (percent): C, 31.44; H, 1.58; F, 59.69; N, 7.33. Found (percent): C, 31.48; H, 1.80; F, 59.65; N, 7.12.

Dimer 6, 2,2,4,4-tetrakis(fluoromethyl)-1,3-bis(methylimino)cyclobutane, absorbed in the infrared 6.08μ (C=N). Its proton and $F^{19}$ n.m.r. spectra were consistent with the assigned structure.

*Analysis.*—Calcd. for $C_{10}H_6F_{12}N_2$ (percent): C, 31.44; H, 1.58; F, 59.69; N, 7.33. Found (percent): C, 31.11; H, 1.86; F, 58.85; N, 7.30.

EXAMPLE 3

One-step preparation of N-methylbis-(trifluoromethyl)ketenimine

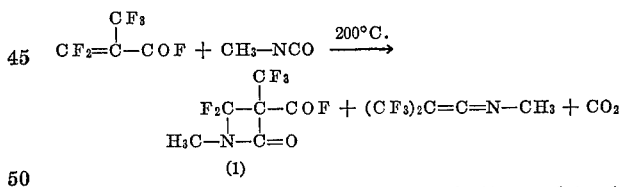

A Carius tube was charged with 11 ml. (0.1 mole) of perfluoromethacrylyl fluoride and 10 ml. of methyl isocyanate and heated at 200° C. for 12 hours. After venting the carbon dioxide, the reaction product was distilled to give 7.1 g. (37% yield) of N-methylbis(trifluoromethyl)ketenimine, B.P. 44° C./100 mm., and 6.2 g. (26% yield) of the cyclic compound 1, B.P. 76° C./10 mm., identical with that obtained in Example 1.

EXAMPLE 4

Cyclic adducts of perfluoromethacrylyl fluoride and n-butyl isocyanate

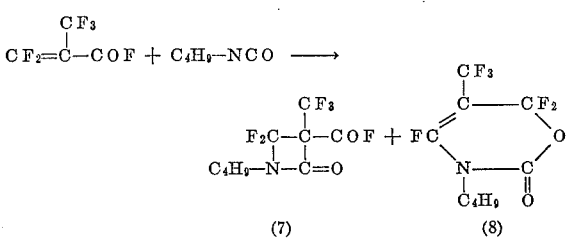

A Carius tube charged with 36 g. (0.202 mole) of perfluoromethacrylyl fluoride and 20 g. (0.202 mole) of n-butyl isocyanate was heated at 100° C. for 90 hours.

There was recovered by distillation of the reaction product 24 g. (42.8% yield) of compound 7, B.P. 72° C./20 mm., and 29 g. (51.7% yield) of compound 8, B.P. 62° C./0.8 mm.

Compound 7, 2,2-difluoro-1-butyl-4-oxo-3-(trifluoromethyl)-3-azetidinecarbonyl fluoride, absorbed in the infrared at 5.37μ (double peak, COF) and 5.61μ (C=O). The proton and $F^{19}$ n.m.r. spectra confirmed the structure.

*Analysis.*—Calcd. for $C_9H_9F_6NO_2$ (percent): C, 39.02; H, 3.28; F, 41.16; N, 5.06. Found (percent): C, 39.01; H, 3.20; F, 41.01; N, 4.98.

Compound 8, 3,6-dihydro-3-butyl-4,6-trifluoro-5-(trifluoromethyl)-2H-1,3-oxazin-2-one, absorbed in the infrared at 5.57μ and 5.50μ (C=O's). The proton and $F^{19}$ n.m.r. spectra confirmed the structure.

*Analysis.*—Calcd. for $C_9H_9F_6NO_2$ (percent): C, 39.02; H, 3.28; F, 41.16; N, 5.06. Found (percent): C, 39.03; H, 3.31; F, 41.20; N, 4.97.

EXAMPLES 5-8

The reaction of Example 4 was repeated in various solvents. In each case a Carius tube was charged with 11 ml. (0.1 mole) of perfluoromethacrylyl fluoride, 11.3 ml. (0.1 mole) of n-butyl isocyanate and 25 ml. of solvent (no solvent was used in one case). The tubes were heated at 100° C. for 88 hours. Table I below shows the yields, based on the distilled product, of compound 7 and compound 8. The results indicate that polar solvents favor the formation of the four-membered cyclic adduct 7 and nonpolar solvents favor the formation of the six-membered cyclic compound 8.

TABLE I

| Example: | Solvent | Percent yield of compound 7 | Percent yield of compound 8 |
|---|---|---|---|
| 5 | None | 37.0 | 45.5 |
| 6 | Hexane | 32.5 | 50.5 |
| 7 | Methylene chloride | 34.6 | 43.2 |
| 8 | Nitromethane | 53.2 | 22.4 |

EXAMPLE 9

Preparation of N-n-butylbis(trifluoromethyl)ketenimine

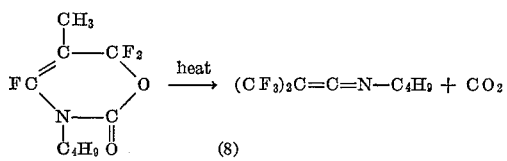

Compound 8 (19.9 g.) was heated in a sealed tube at 200° C. for 4 hours. After venting the carbon dioxide, the residue was distilled to give 12 g. (72% yield) of N-n-butyl-bis(trifluoromethyl)ketenimine, B.P. 66° C./40 mm., $n_D^{25}$ 1.3628. It absorbed in the infrared at 4.74μ (C=C=N). The proton and $F^{19}$ n.m.r. spectra were consistent with the structure.

*Analysis.*—Calcd. for $C_8H_9F_6N$ (percent): C, 41.24; H, 3.89; F, 48.93; N, 6.01. Found (percent): C, 41.46; H, 3.86; F, 48.88; N, 5.90.

By applying the described procedures to other alkyl or cycloalkyl isocyanates, there are obtained other products of this invention having one of the formulas

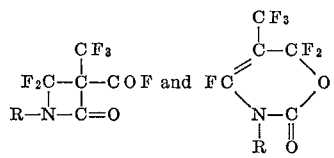

where R is alkyl (straight chain or branched chain) or 1-18 carbons or cycloalkyl of 5-6 ring carbons, and ketenimines of formula $(CF_3)_2C=C=N-R$, where R is as above. Additional examples of these three classes of products are those in which R is ethyl, propyl, sec-butyl, tert-butyl, n-hexyl, 2-methylhexyl, n-dodecyl, n-hexadecyl, n-octadecyl, cyclopentyl and cyclohexyl.

The four-membered cyclic compounds of Formula I are useful as waterproofing agents for cellulosic fibers. Thus, when filter paper and cotton fabrics are treated with acetone containing about 0.5% of pyridine, then with a few drops of a compound of Formula I after which the substrate is dried in warm air, no wetting is observed at the points where the drops had been applied upon immersing the substrate in water.

The six-membered cyclic compounds of Formula II are solvents for certain fluoroethylene polymers, such as the low molecular weight polytetrafluoroethylene having a melting point range of 83-150° C., chiefly 135-140° C., and a molecular weight about 1250. Solutions of about 2% concentration of this polymer in the compounds corresponding Formula II can be used to impregnate cellulosic materials such as paper or cotton. After washing the impregnated substrate with acetone and drying, the substrate is water-repellent.

The N-alkyl- and N-cycloalkylbis(trifluoromethyl)-ketenimines are useful as antistatic agents for wool. The wool is heated with the compound at about 100° C. for about 30 minutes and then dried or washed free of the compound with a solvent such as trichloroethylene or dichloromethane. The antistatic effect is demonstrated by rubbing a strip of the treated fabric with a plastic rod. The fabric shows little attraction to the rod. A control sample of untreated fabric is strongly attracted to the rod after rubbing.

The foregoing detailed description has been given for clarity of understanding only and no unnecessary limitations are to be understood therefrom. The invention is not limited to the exact details shown and described for obvious modifications will be apparent to those skilled in the art.

The embodiments of the invention in which an exclusive property or privilege is claimed are defined as follows:

1. A compound selected from the group consisting of

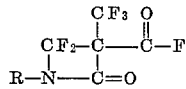

and

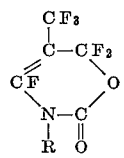

wherein R is alkyl of 1-18 carbons or cycloalkyl of 5-6 carbons.

2. A compound of claim 1 of the formula

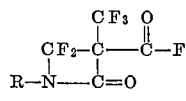

wherein R is alkyl of 1-18 carbons or cycloalkyl of 5-6 carbons.

3. A compound of claim 1 of the formula

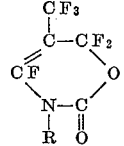

wherein R is alkyl of 1-18 carbons or cycloalkyl of 5-6 carbons.

4. A compound of claim 2 wherein R is methyl.

5. A compound of claim 2 wherein R is n-butyl.

6. A compound of claim 3 wherein R is methyl.

7. A compound of claim 3 wherein R is n-butyl.

8. A process for preparing a compound of claim 1 comprising heating, at a temperature not exceeding about 300° C., a mixture of perfluoromethacrylyl fluoride and a compound of the formula $$R-N=C=O$$

wherein R is alkyl of 1–18 carbons or cycloalkyl of 5–6 carbons.

References Cited

Ziegler et al.: Monatsh. Chem., vol. 96, pp. 1296–1301 (1965).

ALTON D. ROLLINS, Primary Examiner

U.S. Cl. X.R.

117—135.5, 139.5; 260—30.2, 30.4, 244, 485, 486, 487, 544, 561, 566